(12) United States Patent
Zhou (10) Patent No.: US 10,187,653 B2
(45) Date of Patent: Jan. 22, 2019

(54) MOTOR VECTOR PREDICTION USING CO-LOCATED PREDICTION UNITS

(71) Applicant: Broadcom Corporation, Irvine, CA (US)

(72) Inventor: Minhua Zhou, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 210 days.

(21) Appl. No.: 15/148,396

(22) Filed: May 6, 2016

(65) Prior Publication Data

US 2016/0344903 A1 Nov. 24, 2016

Related U.S. Application Data

(60) Provisional application No. 62/163,024, filed on May 18, 2015, provisional application No. 62/329,528, filed on Apr. 29, 2016.

(51) Int. Cl.

| | | |
|---|---|---|
| *H04N 19/52* | (2014.01) | |
| *H04N 11/02* | (2006.01) | |
| *H04N 11/04* | (2006.01) | |
| *H04N 19/115* | (2014.01) | |
| *H04N 19/139* | (2014.01) | |
| *H04N 19/523* | (2014.01) | |
| *H04N 19/96* | (2014.01) | |

(52) U.S. Cl.
CPC ........... *H04N 19/523* (2014.11); *H04N 19/52* (2014.11); *H04N 19/96* (2014.11)

(58) Field of Classification Search
CPC .... H04N 19/176; H04N 19/52; H04N 19/593; H04N 19/61; H04N 19/105; H04N 19/172; H04N 19/184; H04N 19/503; H04N 19/51; H04N 19/573
See application file for complete search history.

(56) References Cited

U.S. PATENT DOCUMENTS

| | | | | |
|---|---|---|---|---|
| 9,319,716 | B2 * | 4/2016 | Chien | H04N 19/895 |
| 2013/0022127 | A1 * | 1/2013 | Park | H04N 19/52 |
| | | | | 375/240.16 |
| 2016/0219278 | A1 * | 7/2016 | Chen | H04N 19/56 |
| 2017/0347117 | A1 * | 11/2017 | Bici | H04N 19/52 |

OTHER PUBLICATIONS

Chen, J., et al., Algorithm Description of Joint Exploration Test Model 2, Joint Video Exploration Team (JVET), Feb. 20-26, 2016, pp. 1-32, JVET-B1001 v.3, San Diego, CA.

* cited by examiner

*Primary Examiner* — Dave Czekaj
*Assistant Examiner* — Alison Slater
(74) *Attorney, Agent, or Firm* — Morgan, Lewis & Bockius LLP (57) ABSTRACT

A system includes motion vector prediction circuitry that generates motion vectors for pixel groups and pixel subgroups within the pixel groups. For a current pixel group within the currently processed picture, the motion vector prediction circuitry selects a target reference picture. Without first translating the current pixel group in accord with an offset vector, the motion vector prediction circuitry initiates generation of a default motion vector for the current pixel group. Responsive to the selected target reference picture, the motion vector prediction circuitry generates the offset vector. The motion vector prediction circuitry translates the current pixel group in accord with offset vector and determines motion vectors for pixel subgroups of the current pixel group based on the translated position of the current pixel group.

20 Claims, 8 Drawing Sheets

| | Test 1 | | | Test 2 | | | Test 3 | | | Test 4 | | | Test 5 | | |
|---|---|---|---|---|---|---|---|---|---|---|---|---|---|---|---|
| | ATMVP off | | | Two Reference Frames | | | Shift Forgone | | | No Shift, Two Ref. Pic. | | | No Shift, One Pic., Par. | | |
| | Random Access Main | | | Random Access Main | | | Random Access Main | | | Random Access Main | | | Random Access Main | | |
| | Y | U | V | Y | U | V | Y | U | V | Y | U | V | Y | U | V |
| Class A | 1.5% | 1.6% | 1.9% | 0.0% | 0.1% | 0.5% | 0.0% | -0.2% | 0.0% | 0.1% | -0.1% | 0.1% | 0.5% | 0.6% | 1.0% |
| Class B | 1.4% | 1.3% | 1.2% | 0.1% | 0.0% | 0.1% | 0.1% | 0.0% | 0.1% | 0.1% | 0.0% | 0.1% | 0.2% | 0.1% | 0.2% |
| Class C | 1.3% | 1.1% | 1.3% | 0.0% | 0.0% | 0.1% | 0.1% | 0.0% | 0.0% | 0.1% | 0.0% | 0.1% | 0.1% | 0.1% | 0.2% |
| Class D | 1.6% | 1.4% | 1.5% | -0.1% | 0.1% | 0.3% | 0.0% | -0.1% | 0.2% | 0.0% | 0.1% | 0.2% | 0.0% | 0.1% | 0.1% |
| Class E | 2.0% | 1.8% | 1.8% | 0.0% | 0.0% | 0.1% | 0.0% | -0.1% | 0.2% | 0.1% | 0.0% | 0.2% | 0.1% | 0.0% | 0.1% |
| Overall | 1.5% | 1.4% | 1.5% | 0.0% | 0.0% | 0.2% | 0.0% | 0.0% | 0.1% | 0.1% | 0.0% | 0.1% | 0.2% | 0.2% | 0.3% |
| Class F | 0.6% | 0.7% | 0.7% | 0.1% | 0.1% | 0.1% | 0.0% | 0.2% | 0.1% | 0.1% | 0.1% | 0.2% | 0.1% | 0.3% | 0.3% |

| | Low delay B Main | | | Low delay B Main | | | Low delay B Main | | | Low delay B Main | | | Low delay B Main | | |
|---|---|---|---|---|---|---|---|---|---|---|---|---|---|---|---|
| | Y | U | V | Y | U | V | Y | U | V | Y | U | V | Y | U | V |
| Class A | 1.1% | 0.9% | 1.2% | 0.0% | 0.0% | 0.0% | 0.0% | -0.4% | 0.1% | 0.0% | -0.2% | -0.1% | 0.0% | -0.4% | -0.1% |
| Class B | 1.2% | 0.8% | 0.8% | 0.0% | 0.0% | -0.2% | 0.0% | -0.1% | -0.3% | 0.0% | 0.1% | 0.0% | 0.1% | 0.0% | 0.2% |
| Class C | 1.4% | 1.4% | 1.3% | 0.0% | 0.0% | -0.6% | 0.1% | 0.2% | -0.1% | 0.0% | -0.1% | -0.3% | 0.0% | 0.0% | 0.0% |
| Class D | 1.4% | 1.2% | 1.2% | 0.1% | 0.0% | 0.1% | 0.1% | 0.3% | 0.5% | 0.0% | 0.3% | 0.4% | 0.0% | 0.2% | 0.1% |
| Class E | 3.2% | 2.4% | 2.7% | 0.0% | -0.3% | -0.8% | 0.0% | -0.1% | 0.2% | 0.1% | 0.2% | -0.7% | 0.1% | -0.1% | 0.0% |
| Overall | 1.7% | 1.4% | 1.5% | 0.0% | 0.0% | -0.3% | 0.1% | -0.1% | 0.0% | 0.1% | 0.1% | 0.1% | 0.0% | 0.0% | 0.1% |
| Class F | 0.7% | 1.3% | 0.8% | 0.1% | -0.3% | -0.4% | 0.1% | -0.1% | 0.2% | 0.0% | 0.2% | -0.3% | 0.0% | 0.1% | -0.1% |

Figure 8

MOTOR VECTOR PREDICTION USING CO-LOCATED PREDICTION UNITS

PRIORITY CLAIM

This application claims priority to provisional application Ser. No. 62/163,024, filed May 18, 2015 and provisional application Ser. No. 62/329,528, filed Apr. 29, 2016, each of which is entirely incorporated by reference.

TECHNICAL FIELD

This disclosure relates to digital image coding.

BACKGROUND

Rapid advances in electronics and communication technologies, driven by immense customer demand, have resulted in the worldwide adoption of devices that display a wide variety of video content. Examples of such devices include smartphones, flat screen televisions, and tablet computers. Improvements in video processing techniques will continue to enhance the capabilities of these devices.

DETAILED DESCRIPTION

The disclosure below discusses techniques and architectures for selection of motion vectors for pixel groups and pixel subgroups within a coded image. For example, a pixel group may include a prediction unit (PU) or coding unit (CU) or coding tree unit (CTU) within a picture. A motion vector for a pixel group may indicate the reference picture index of the target reference picture as well as the location of predictor pixel group, for example a pixel group with same or similar pixel values, within a target reference picture different from the current picture being processed. For example, a target reference picture may include a temporally previous picture or subsequent picture.

Pixel subgroups of the pixel group may be individually assigned motion vectors. Thus, the pixel subgroups within a single pixel group may have differing motion vectors. However, in some cases, pixel subgroups may be assigned identical motion vectors, for example, by pixel group-level assignment or by individual assignments that coincidentally yield the same results.

Figure 1:
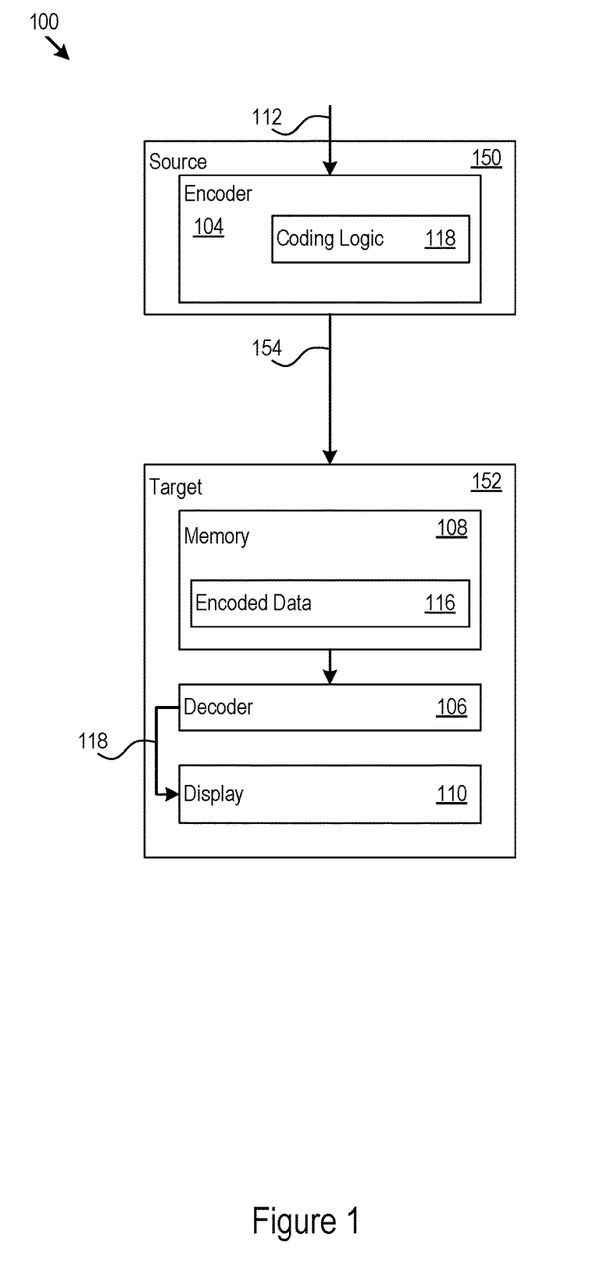
FIG. 1 shows an example architecture in which a source communicates with a target through a communication link.

FIG. 1 shows an example architecture 100 in which a source 150 communicates with a target 152 through a communication link 154. The source 150 or target 152 may be present in any device that manipulates image data, such as a DVD or Blu-ray player, streaming media device a smartphone, a tablet computer, or any other device. The source 150 may include an encoder 104. The target 152 may include a decoder 106, memory 108, and display 110. The encoder 104 receives source data 112 (e.g., source image data) and may model or simulate a physical buffer that temporarily stores compressed output data. The encoder 104 may also evaluate the encoded symbols for transmission at a predetermined bit rate. The encoder 104 may specify the bit rate, as just two examples, in units of bits per pixel, or in units of bits per unit of time. The coding logic 118 may, among other things, select motion vectors for pixel groups or subgroups as discussed below.

The encoder 104 may determine the bit rate, for example, by maintaining a cumulative count of the number of bits that are used for encoding minus the number of bits that are output. Further, the encoder 104 may adjust a quantization step for encoding responsive number of bits, the cumulative count or other parameters. An exemplary encoder 104 and operation of the encoder 104 are described below.

The memory 108 may be implemented as Static Random Access Memory (SRAM), Dynamic RAM (DRAM), a solid state drive (SSD), hard disk, or other type of memory. The communication link 154 may be a wireless or wired connection, or combinations of wired and wireless connections. The encoder 104, decoder 106, memory 108, and display 110 may all be present in a single device (e.g. a smartphone). Alternatively, any subset of the encoder 104, decoder 106, memory 108, and display 110 may be present in a given device. For example, a streaming video playback device may include the decoder 106 and memory 108, and the display 110 may be a separate display in communication with the streaming video playback device.

In various implementations, different codecs may be used to perform coding operations, such as encoding, decoding, transcoding, and/or other coding operations. For example, codecs may include, the high efficiency video coding (HEVC), VP9 available from Google, Daala, audio video standard 2 (AVS2), and/or other codecs. Codecs may employ multiple modes which may be selected for differing coding conditions and resources.

Figure 2:
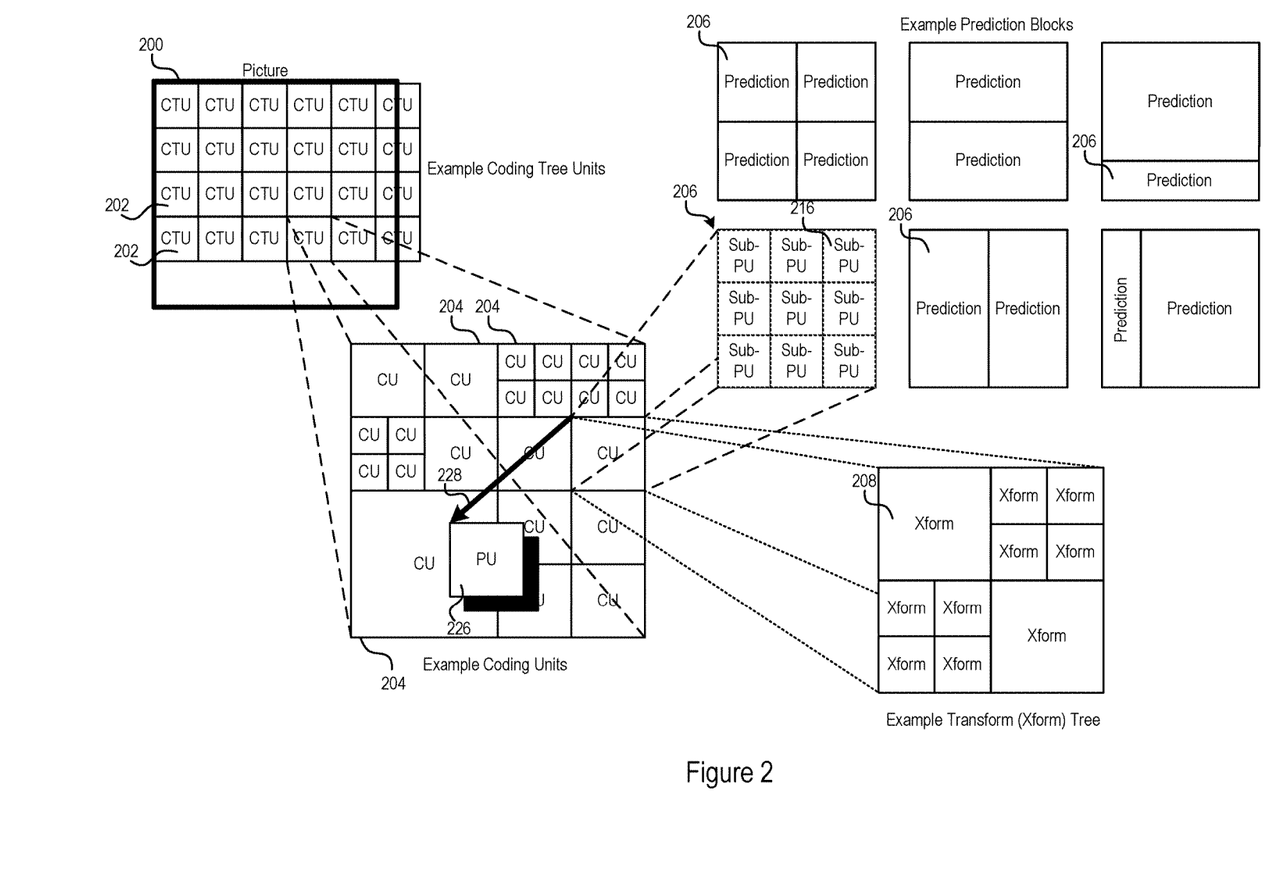
FIG. 2 shows an example block coding structure, in which different block sizes may be selected.

In various implementations, a coding mode may use a particular block coding structure. FIG. 2 shows an example block coding structure. As shown in FIG. 2, a picture 200 is divided into coding tree units (CTUs) 202 that may vary widely in size, e.g., 16×16 pixels or less to 64×64 pixels or more in size. A CTU 202 may further decompose into coding units (CUs) 204. A CU can be as large as a CTU and the smallest CU size can be as small as desired, e.g., down to 8×8 pixels. At the CU level, a CU is split into prediction units (PUs) 206. The PU size may be smaller or equal to the CU size for intra-prediction or inter-prediction. The CU 204 may be split into transform units (TUs) 208 for transformation of a residual prediction block. TUs may also vary in size. Within a CTU, some CUs can be intra-coded, while others can be inter-coded. Such a block structure offers the coding flexibility of using different PU sizes and TUs sizes based on characteristics of incoming content. In some cases, systems may use large block size coding techniques (e.g., large prediction unit size up to, for instance, 64×64, large transform and quantization size up to, for instance, 32×32) which may support efficient coding.

In some cases, a PU 206 may be further split into sub-PUs 216, which may include groups of pixels containing a subset of the pixels in the PU. The sub-PUs 216 may have individually assigned prediction vectors, which may be derived from motion vectors of co-located PUs or sub-PUs from other pictures. In some cases, prediction vectors for sub-PUs may be selected after shifting the PU 206 in accord with an offset 228 to generate shifted PU 226. A default motion vector for the PU 206 may be determined based on motion vectors of co-located PUs or sub-PUs from other pictures without first shifting the PU 206.

For example, a co-located PU may include a PU that overlaps in whole or in part with the space occupied by the PU but within another picture. In some implementations, a co-located PU may be a PU from another picture that includes the pixel position of a predetermined pixel of the PU. For example, the upper left pixel of the current PU or another predetermined pixel. Additionally or alternatively, a co-located PU may include a PU from another picture that includes the most overlapping pixels of any PU in the picture. Other co-located PU selection criteria may be used. In some cases, the selection criteria may be defined by a codec or coding standard, for example, as a parameter of a coding mode.

Figure 3:
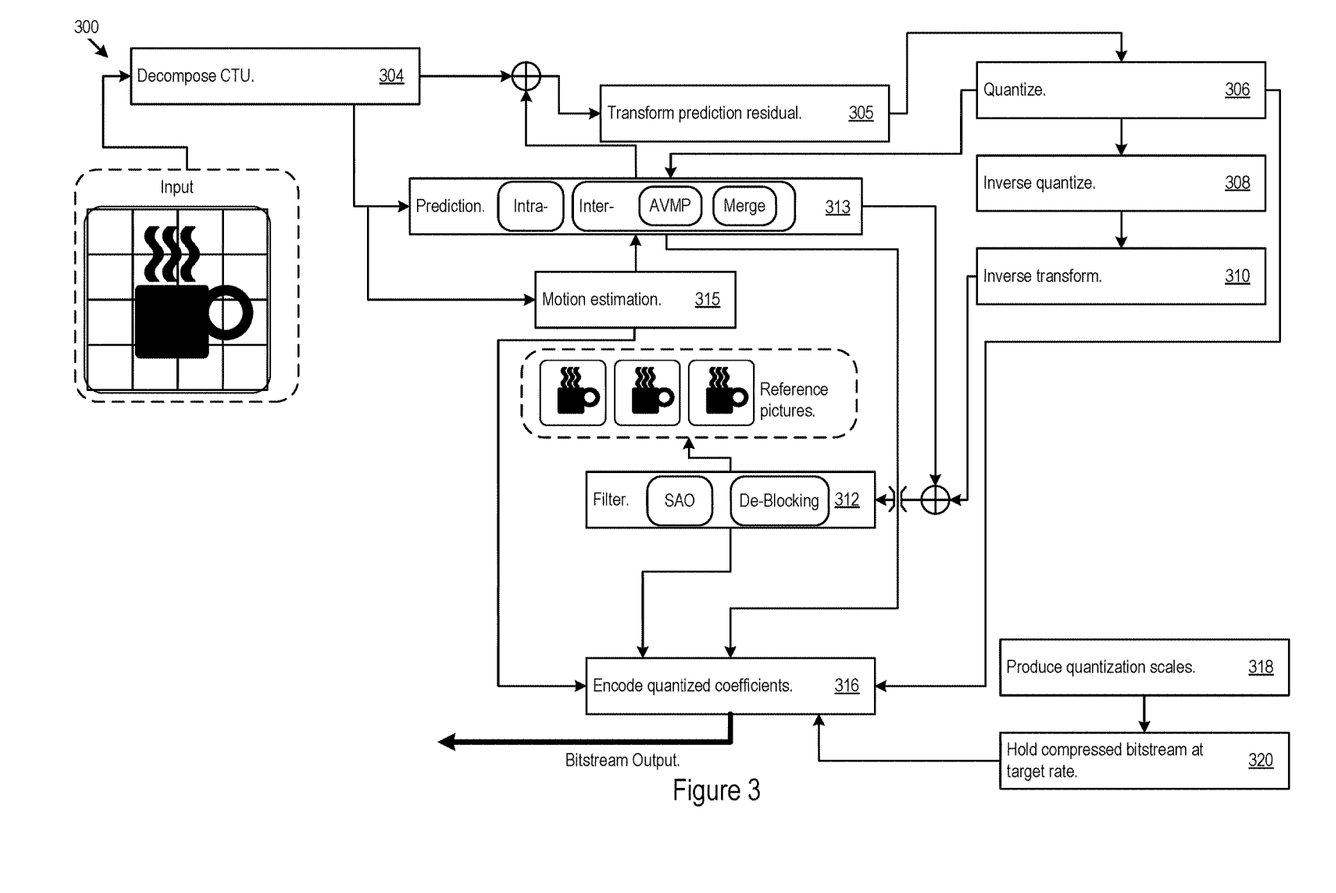
FIG. 3 shows example coding logic for CTU processing.

FIG. 3 shows example coding logic 300 for CTU processing, which may be implemented by coding circuitry. As shown in FIG. 3, the coding logic 300 may decompose a CTU, e.g., from a picture or decomposed tile, into CUs (304). CU motion estimation and intra-prediction are performed to allow selection of the inter-mode and/or intra-mode for the CU (313). The coding logic 300 may transform the prediction residual (305). For example, a discrete cosine transform (DCT), a discrete sine transform (DST), a wavelet transform, a Fourier transform, and/or other transform may be used to decompose the block into frequency and/or pixel component. In some cases, quantization may be used to reduce or otherwise change the number of discrete chroma and/or luma values, such as a component resulting from the transformation operation. The coding logic 300 may quantize the transform coefficients of the prediction residual (306). After transformation and quantization, the coding logic 300 may reconstruct the CU encoder via inverse quantization (308), inverse transformation (310), and filtering (312). In-loop filtering may include de-blocking filtering, Sample Adaptive Offset (SAO) filtering, and/or other filtering operations. The coding logic 300 may store the reconstructed CU in the reference picture buffer. The picture buffer may be allocated on off-chip memory to support large picture buffers. However, on-chip picture buffers may be used. At the CTU level, the coding logic 300 may encode the quantized transform coefficients along with the side information for the CTU (316), such as prediction modes data (313), motion data (315) and SAO filter coefficients, into the bitstream using a coding scheme such as, Context Adaptive Binary Arithmetic Coding (CABAC). The coding logic 300 may include rate control, which is responsible for producing quantization scales for the CTUs (318) and holding the compressed bitstream at the target bit-rate (320).

The prediction modes (313) may include intra- and inter-coding. Inter-coding may further be extended to AMVP (Advanced Motion Vector Predictor) coding in which motion vectors may be assigned at the PU-level, and Merge mode coding where motion vectors may be assigned at the sub-PU-level. As discussed below, the assignment of default motion vectors at PU (or other pixel group) level may be initiated without first shifting the PU in accord with an offset vector, while the assignment of sub-PU motion vectors may occur after shifting the PU (or other pixel group).

In some coding schemes, such as when the HEVC codec video compression standard is applied with the advanced temporal motion vector predictor (ATMVP) derivation, pixel groups, such as a PU, may be split into multiple pixel subgroups which may have individually assigned motion vectors. The motion vectors indicate a predictive relationship between the pixel group or subgroup assigned the motion vector and a predictor pixel group in a reference picture. The motion vector may indicate the spatiotemporal relationship between the pixel group or subgroup and the predictor pixel group. In some cases, coding circuitry may apply a motion vector selection technique in which a candidate motion vector to serve as a basis for default motion vector, for example a PU level (or pixel group level) ATMVP vector, may be selected by the coding circuitry without first translating the pixel group according to an offset vector. The coding circuitry may select predictor vectors for the individual subgroup motion vectors using the translated subgroup.

Figure 4:
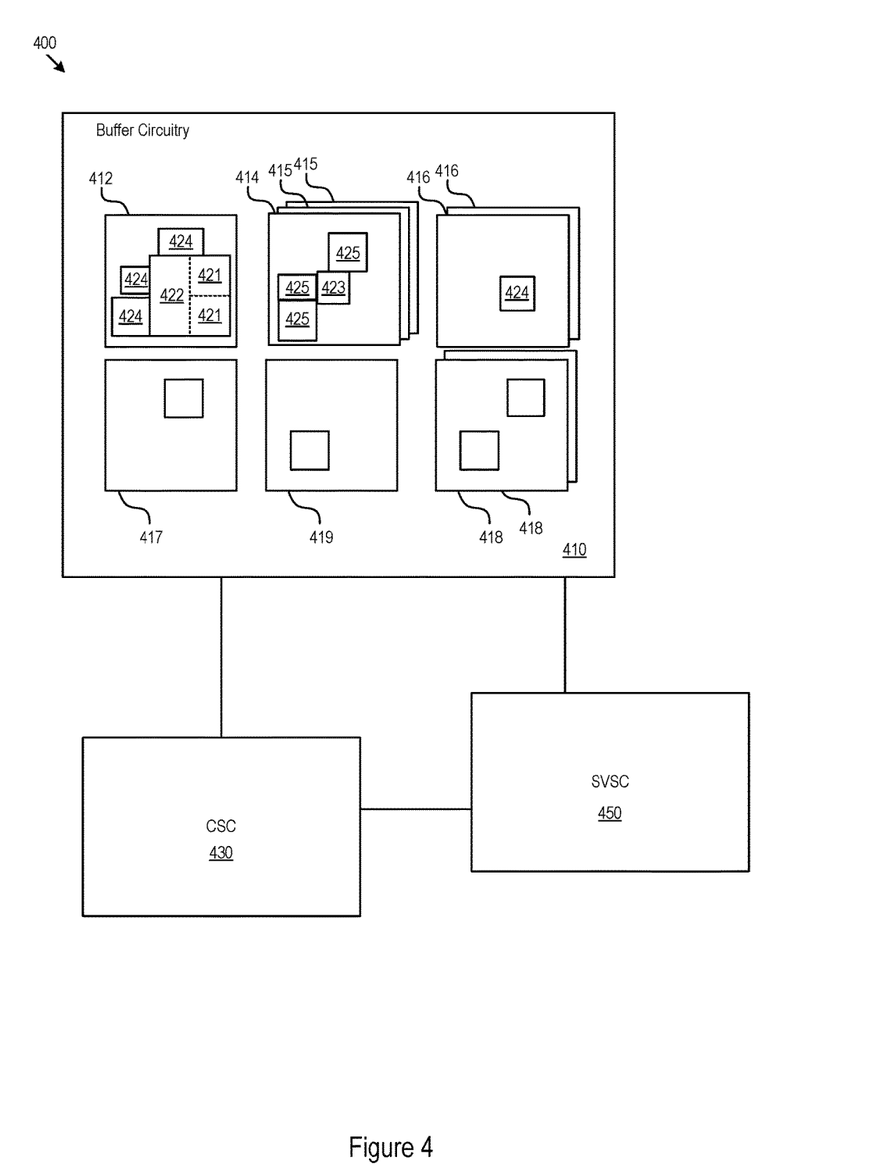
FIG. 4 shows example motion vector prediction circuitry.
Figure 5:
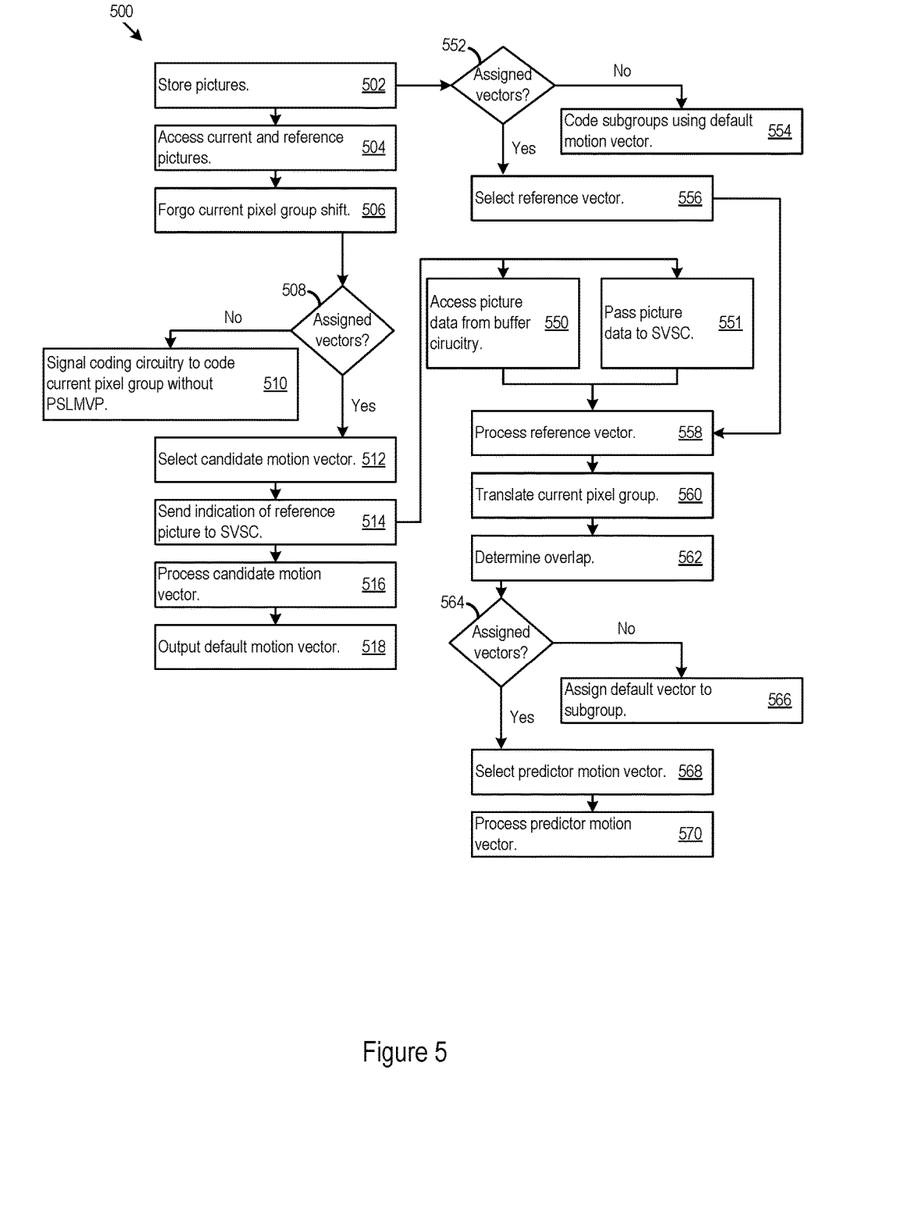
FIG. 5 shows motion vector prediction logic.

FIG. 4 shows example motion vector prediction circuitry (MVPC) 400 for motion vector derivation from predictor motion vectors. FIG. 5 shows accompanying motion vector prediction logic (MVPL) 500, which may be implemented on the MVPC 400. For a current pixel group 422, that includes pixel subgroups 421, the MVPC 400 may include buffer circuitry 410 which may store a current picture 412; one or more reference pictures 414, 415 416, 417, 418, and 419. The reference pictures may include: a target reference picture 414 selected from among one or more available candidate reference pictures 414, 415; temporal neighbor pictures 416; a candidate vector picture 417; one or more predictor pictures 418; and a reference vector picture 419. Although the candidate reference pictures may not necessarily include the other reference pictures 416, 417, 418, and 419 the candidate reference pictures 415 may, in some cases, include some or all of the other reference pictures 416, 417, 418, and 419. In some implementations, a single candidate reference picture 414 is available. Accordingly, the single available candidate reference picture 414 serves as the selected target reference picture 414. The pictures 412, 414, 415, 416, 417, 418, 419 may include pictures, such as those within a video. The pictures 412, 414, 415, 416, 417, 418, 419 may include pixel groups, such as CTUs, CUs, or PUs. Within the current picture, the MVPC 400 may perform motion vector predictor selection for the current pixel group 422. The current picture 412 or temporal neighbor pictures 416 may include one or more neighbor pixel groups 424, for example, a set of spatiotemporal neighbor pixel groups. In various implementations, the temporal neighbor pictures 416 may include a nearest temporal neighbor picture, a most recently processed picture, or other temporally proximate pictures. The neighbor pixel groups 424 may include designated pixel groups. For example, allowed neighbor pixel groups may be pixel groupings that are defined relative to the spatial or temporal position of the current pixel group 422 within the current picture 412. In some cases, the spatial position of a pixel group may be defined according to a grid position of a predetermined pixel within the pixel group, or by the location of the borders of the pixel group, or using another location specific to the pixel group. In an example scenario, the neighbor pixel groups 424 may be pixels groups that occupy the identical or neighboring positions to the current pixel group, within the current picture 412 and/or a temporal neighbor 416 picture. In some cases, the relative positions of the neighbor pixel groups may be defined by a coding standard.

The MVPC 400 may further include candidate selection circuitry (CSC) 430 and subgroup vector selection circuitry (SVSC) 450. The CSC 430 may access the current picture 412 and any of the reference pictures 414, 415, 416, 417 418, and 419 within the buffer circuitry 410 (504). The CSC 430 may process the candidate reference pictures 414, 415 to determine whether pixel groups 423 co-located to the current pixel group 422 in the current picture within the candidate reference pictures 414, 415 have been assigned motion vectors, for example from previous coding operations (508). The CSC 430 processes the co-located pixel groups 423 because the MVPC 400 may select the default motion vector without first translating the current pixel group 422 in accord with any offset vector determined using reference vectors from the neighbor pixel groups 424 in the current picture 412 and/or the temporal neighbor pictures 416. In other words, the CSC 430 forgoes shifting the current pixel group for selection of a default motion vector for the current pixel group (506).

If none of the co-located pixel groups 423 have been assigned motion vectors, the CSC 430 may signal to coding circuitry to code the current pixel group without use of pixel subgroup level motion vector prediction (PSLMVP) (510). If one or more of the co-located pixel groups 423 has an assigned motion vector, the CSC 430 may select a candidate motion vector from among the assigned motion vectors (512). For example, the CSC 430 may select the first assigned motion vector discovered to serve as the candidate motion vector. Additional or alternatively, the CSC 430 may select the motion vector according to a hierarchical preference among the candidate reference pictures 414, 415. Upon determining which of the candidate reference pictures 414, 415 will supply the candidate motion vector, the CSC 430 may send an indicator of the reference picture selection to the SVSC 450 (514). For example, the CSC 430 may send one or more bits indicating a reference picture index for the target reference picture 414 and the SVSC 450 may access reference picture information directly from the buffer circuitry 410 (550). Additionally or alternatively, the CSC 430 may pass relevant reference picture data to the SVSC 450 (551). In some cases where a single candidate reference picture 414 is available, the CSC 430 may forgo sending a signal indicating selection of the single available candidate reference picture as being selected as the target reference picture 414.

If the candidate motion vector at the location of the co-located pixel group 423 references to the candidate vector picture 417, the candidate motion vector may indicate a predictive relationship between the co-located pixel group 423 and a pixel group of the candidate vector picture 417.

The CSC 430 may process the candidate motion vector supplied at co-located pixel group 423 in the target reference picture 414 to generate the default motion vector (516). In other words, the CSC 430 may derive the default motion vector from the candidate motion vector. In some cases, the generation of the default motion vector may include performing a motion vector scaling operation on the candidate motion vector. For example, if the candidate motion vector points to candidate vector picture 417, and the current pixel group 422 references one or two reference pictures 415 (depending on whether the current pixel group 422 uses unidirectional prediction or bi-directional prediction), the candidate motion vector may be scaled in each prediction direction according to a ratio of two durations. The first duration being the temporal distance between the target reference picture 414 and the candidate vector picture 417. The second duration being the temporal distance between the current picture 412 and the reference picture 415 in the corresponding prediction direction, for example, list 0 or list 1, or forward or backward, of the current pixel group 422. If the current pixel group 422 uses bi-directional prediction, candidate motion vector is scaled in both prediction directions to generate the default motion vector. Once the default motion vector is generated by the CSC 430, the CSC 430 may output the default motion vector for use by the SVSC 450 (518).

Now referring to operation of the SVSC 450, the SVSC 450 may begin processing the current picture 412 (and/or temporal neighbor picture 416) to determine whether the neighbor pixel groups 424 have been assigned motion vectors, for example from previous coding operations (552). In some cases, the SVSC 450 may begin processing the current picture 412 and/or a temporal neighbor picture 416 without first receiving an indication that a particular reference picture has been selected as the target reference picture 414. In other words, the SVSC 450 may process the reference pictures in a parallel operation to the search by the CSC 430 for candidate motion vectors in the co-located pixel groups. If none of the neighbor pixel groups 424 have been assigned motion vectors, the SVSC 450 may signal to coding circuitry to code the pixel subgroups 421 using the default motion vector (554) if available. If one or more of the neighbor pixel groups 424 has an assigned motion vector, the SVSC 450 may select a reference vector from among the assigned motion vectors (556). For example, the SVSC 450 may select the first assigned motion vector discovered to serve as the reference vector. Additionally or alternatively, the SVSC 450 may select the reference vector according to a hierarchical preference among the neighbor pixel groups 424. In some cases, the SVSC 450 may combine or average multiple assigned motion vectors from multiple neighbor pixel groups to determine the reference vector. Because the reference vector is selected from or is derived from motion vectors assigned to neighbor pixel groups 424, the reference vector indicates a predictive relationship between the neighbor pixel group 424 and a pixel group in the reference vector picture 419, assuming that the reference vector uses the reference vector picture 419 as its reference picture.

Once the SVSC 450 selects the reference vector, the SVSC 450 may process the reference vector to generate an offset vector (558). For example, the SVSC 450 may perform a scaling operation on the reference vector. For the example scaling operation, the SVSC 450 may scale the reference vector in accord with the ratio of the two durations established among the current picture 412, the reference vector picture 419, and the target reference picture 414. For example, where the first duration is the temporal distance between the current picture 412 and the reference vector picture 419, and the second duration is the temporal distance between the current picture 412 and the target reference picture 414.

In some cases, the SVSC 450 may begin processing a reference vector without first receiving an indication that a particular reference picture has been selected as the target reference picture. In other words, the SVSC 450 may process the reference vector in a parallel operation to the search by the CSC 430 for candidate motion vectors in the co-located pixel groups. If the coding circuitry only allows selecting the target reference picture from a single reference picture, an indication that the only available reference picture was the one selected may not necessarily be needed to begin.

Using the determined offset vector, the SVSC 450 may shift or otherwise translate the current pixel group 422 (560) to determine a new location for the current pixel group in the target reference picture 414. For example, the SVSC may compute a new temporal motion data position (TMDP) for the current pixel group 422. Because the offset vector associates the position of the current pixel group 422 with a second position within the target reference picture 414, the offset vector may be logically decomposed as a temporal shift between the current picture 412 and the target reference picture 414 and a spatial shift. The spatial shift may be logically applied before, after, or at the same time as the temporal shift.

Returning again to FIGS. 4 and 5, after shifting the current pixel group 422, the SVSC 450 may determine the spatial overlap between pixel subgroups 421 of the current pixel group 422 and predictor pixel groups 425 of the target reference picture 414 (562). For example, the SVSC 450 may determine whether a predetermined pixel within a pixel subgroup occupies the same spatial position as a pixel within a predictor pixel group 425, or by other techniques for determining spatial overlap such as those discussed above with respect to the co-located pixel groups 423.

Once the SVSC 450 determines overlap, the SVSC may determine whether the overlapping predictor pixel group 425 within the target reference picture 414 has an assigned motion vector (564). If the overlapping predictor pixel group 425 does not have an assigned motion vector, the SVSC 450 may assign the default motion vector to the corresponding pixel subgroup 421 in the current pixel group (566). If the overlapping predictor pixel group 425 has an assigned motion vector, the SVSC 450 may select the assigned motion vector as a predictor motion vector for the corresponding pixel subgroup in the current pixel group (568). If a predictor motion vector is selected, the SVSC 450 may process the predictor motion vector to generate a subgroup motion vector (570). For example, the SVSC 450 may perform a scaling operation on the predictor motion vector. For the example scaling operation, if the prediction motion vector points to a reference picture 418, and the current pixel subgroup 421 references one or two reference pictures 415 (depending on whether the current pixel subgroup 421 uses unidirectional prediction or bi-directional prediction), the SVSC 450 may scale the predictor motion vector in accord with the ratio of the two durations established among the current picture 412, the target reference picture 414, the reference picture(s) 415 of the current pixel subgroup 421 and the reference picture 418 of the predictor motion vector; first duration is the temporal distance between the target reference picture 414 and the reference picture 418 of the predictor motion vector, and the second duration is the temporal distance between current picture 412 and the reference picture 415 in the corresponding prediction direction of the current pixel subgroup 421. If the current pixel subgroup 421 uses bi-directional prediction, the predictor motion vector is scaled in both prediction directions to generate the subgroup motion vector.

The SVSC 450 may assign either the default motion vector or a subgroup motion vector to pixel subgroups 421 of the current pixel group 422. In some cases, the predictor pixel groups 425 may be have different sizes or relative alignments from those of the pixel subgroups 421. Accordingly, in some cases, multiple pixel subgroups 421 may be determined to overlap with the same predictor pixel group 425.

Further, a pixel subgroup 421 may have some pixels that overlap with a first predictor pixel group 425 and some other pixels that overlap with a second predictor group 425. In some implementations, a predetermined pixel of the pixel subgroup 421 may control the overlap determination, as discussed above. However, other methods of selection may be used. For example, a predetermined hierarchy may be used. In an example hierarchy, the hierarchy may establish that the most recently processed predictor pixel group be used over later processed predictor pixel groups. Further, motion vectors from multiple predictor pixel groups may be combined or averaged to derive the predictor motion vector. The SVSC 450 may repeat, or perform in parallel, subgroup motion vector selection for the subgroups within the current pixel subgroup.

Figure 6:
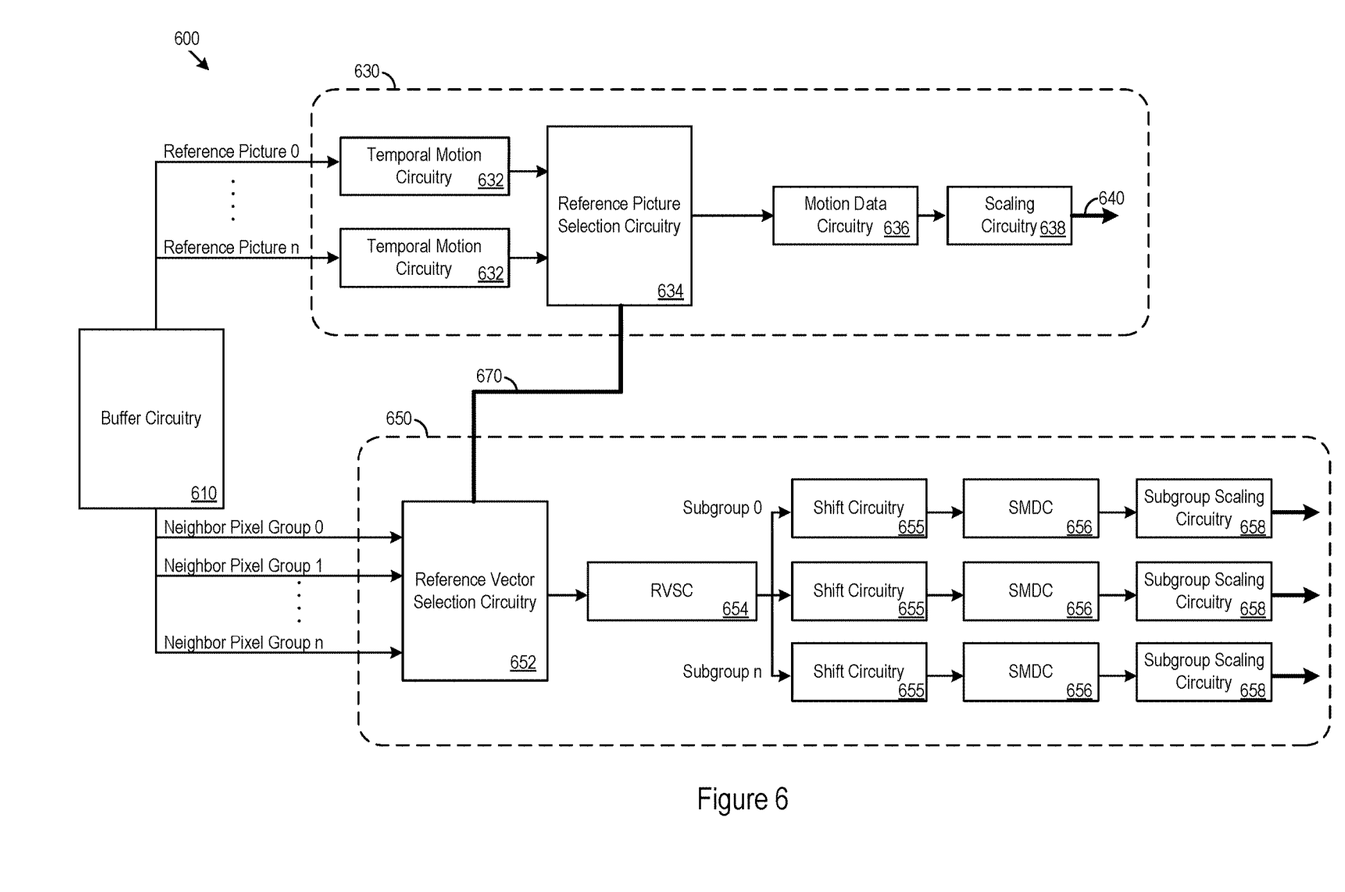
FIG. 6 shows example motion vector prediction circuitry for handling motion vector predictor selection from one or more reference pictures.

Moving now of FIG. 6, example MVPC 600 for handling motion vector predictor selection from one or more reference pictures is shown. The MVPC 600 may include buffer circuitry 610, CSC 630, and SVSC 650. The temporal motion circuitry 632 of the CSC 630 may fetch reference picture data and current picture data from the buffer circuitry 610. In some cases, the fetch operations from the multiple references pictures may be performed in parallel. Alternatively, the fetch operations may be performed serially. In some cases, parallel operation may increase overall processing speed, but may also consume more memory bandwidth than serial fetch operations. The reference picture selection circuitry 634 within the CSC 630 may identify a reference picture with an assigned motion vector as the target reference picture for the co-located pixel group, as discussed above. The reference picture selection is passed to the SVSC 650 via communication link 670. Communication link 670 may include logical communication links, such a data channels between subroutines or a physical link such as a communications bus or wired or wireless network links. The CSC 630 may proceed to process the candidate motion vector at motion data circuitry 636 and scaling circuitry 638. The motion data circuitry 636 may fetch motion data from the target reference picture at the pixel group level, which may include data about the candidate motion vector beyond an indication or non-indication of its existence. The scaling circuitry 638 may perform motion vector scaling in accord with the ratios discussed above with regard to scaling candidate motion vectors. The CSC 630 may output the default motion vector for coding at output 640.

The SVSC 650 may include reference vector selection circuitry 652. The reference vector selection circuitry 652 may select the neighbor pixel group as discussed above. The SVSC 650 may further include reference vector scaling circuitry (RVSC) 654. The reference vector scaling circuitry 654 may generate the offset vector. Using shift circuitry 655, the SVSC 650 may shift the current pixel group and determine overlap for the pixel subgroups. Via the subgroup motion data circuitry (SMDC) 656, the SVSC 650 may fetch motion data for the predictor pixel groups from the target reference picture in the buffer circuitry 610. Once the predictor motion vectors are selected and fetched, the subgroup vector scaling circuitry 658 may scale the predictor motion vectors to generate the subgroup motion vectors.

In some implementations, the MVPC 600 may be used to handle motion vector predictor selection within a system that allows selection of the target reference picture and motion vector prediction from two available reference pictures. The use of two available reference pictures may allow for greater coding efficiency and flexibility than a similar coding scheme providing a single reference picture for motion vector predictor selection. However, increasing the number of reference pictures used may increase the memory bandwidth consumed by the system or the time used to perform picture fetching operations.

Figure 7:
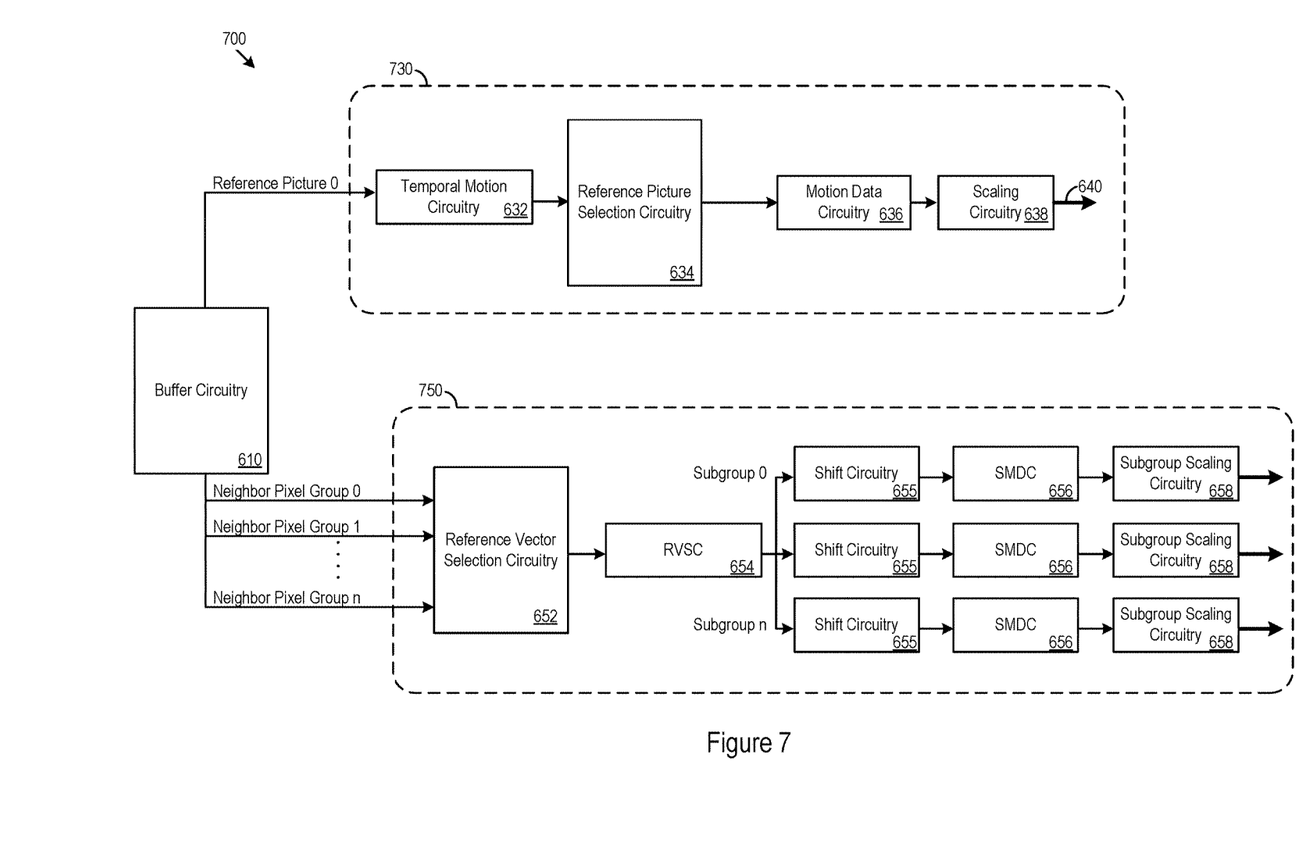
FIG. 7 shows example motion vector prediction circuitry for motion vector predictor selection from a single available reference picture.

When a single reference picture is available for selection of target reference picture and motion vector prediction, the CSC and SVSC may proceed in parallel because the SVSC may not necessarily be dependent on the CSC to indicate the target reference picture. Accordingly, FIG. 7 shows example MVPC 700 for handling motion vector predictor selection from a single available reference picture. In the example MVPC 700, the CSC 730 and SVSC 750 are separately threaded, such that the CSC 730 and SVSC 750 may operate in parallel and independently of one another. The communication link 670 may be omitted from the MVPC 700 since the CSC 730 may not necessarily need to pass indication of the target reference picture selection to the SVSC 750.

Figure 8:
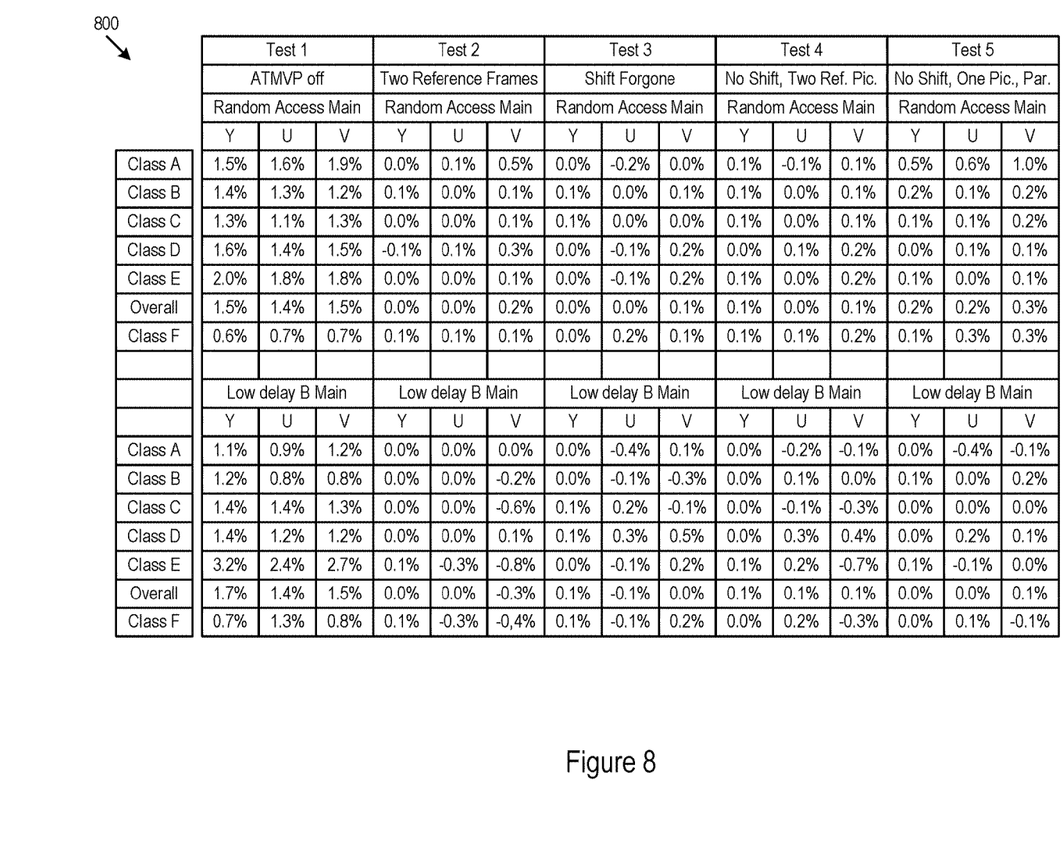
FIG. 8 shows a table with simulation results.

As discussed above, the motion vector predictor techniques and architectures may be implemented in HEVC coding. FIG. 8 shows a table 800 with simulation results for a system implementing the above motion vector predictor selection techniques in the Key Technology Area (KTA) ITU-VCEG (Video Coding Expert Group) software design, which may be similar to HEVC coding with selected additional coding tools for KTA compliance.

Five Tests were Performed:

Test 1: ATMVP was turned off in a KTA software implementation to measure the potential quality for ATMVP.

Test 2: ATMVP was turned on in a KTA software implementation with the number of reference pictures used for computing the PU-level TMDPs set to two.

Test 3: ATMVP was turned on while shifting the current-PU ahead of the target reference picture selection is forgone.

Test 4: ATMVP was turned on while shifting the current-PU ahead of the target reference picture selection is forgone and the number of reference pictures used for computing the PU-level TMDPs set to two.

Test 5: ATMVP was turned on while shifting the current-PU ahead of the target reference picture selection is forgone; the number of reference pictures used for computing the PU-level TMDPs set to one; and the default motion vector selection process is performed in a parallel operation to the subgroup motion vector selection process.

As shown in the table 800, the quality losses associated with forgoing shifting the current-PU ahead of reference picture selection, and reducing the number available reference pictures to one (or two) may be 0.1% or 0.2%, in some cases. This may correspond to maintaining about 87%-93% of the gains achieved by implementing ATMVP coding in the KTA. In some implementations, the quality losses may be acceptable in exchange for reductions in processing complexity and memory bandwidth consumption. For example, a system that shifts the current-PU ahead of reference picture selection may implement parallel motion vector scaling hardware threads for each of the available reference pictures to meet video coding timing guidelines. In some cases, implementing parallel motion vector scaling hardware threads may increase the area occupied by coding circuitry and may increase the overall cost of the coding circuitry.

The methods, devices, processing, modules, image encoding and decoding systems, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A device comprising:
    buffer circuitry configured to store:
        a current picture comprising a current pixel group comprising a pixel subgroup;
        a target reference picture comprising a co-located pixel group that includes a spatial position in the target reference picture occupied by the current pixel group in the current picture; and
        a reference vector picture;
    candidate selection circuitry in data communication with the buffer circuitry, the candidate selection circuitry configured to:
        without first shifting the current pixel group in accord with an offset vector, determine the co-located pixel group has an assigned candidate motion vector;
        determine a default motion vector from the assigned candidate motion vector of the co-located pixel group; and
    subgroup vector selection circuitry in data communication with the buffer circuitry and the candidate selection circuitry, the subgroup vector selection circuitry configured to:
        determine that a spatiotemporal neighbor pixel group has an assigned reference vector that indicates a predictive relationship that points to the reference vector picture;
        determine a ratio of a first duration between the current picture and the reference vector picture to a second duration between the current picture and the target reference picture;

scale the reference vector in accord with the ratio to determine the offset vector;

shift the current pixel group in accord with the offset vector, and then determine whether a pre-determined pixel of the pixel subgroup occupies a spatial position that is occupied by a predictor pixel group that is assigned a predictor motion vector;

when the pre-determined pixel of the pixel subgroup occupies the spatial position that is occupied by the predictor pixel group that is assigned a predictor motion vector, processing the predictor motion vector to generate a subgroup motion vector for the pixel subgroup; and when the pre-determined pixel of the pixel subgroup does not occupy the spatial position that is occupied by the predictor pixel group that is assigned the predictor motion vector, assigning the default motion vector to the pixel subgroup irrespective of whether other predictor pixel groups are assigned predictor motion vectors.

2. The device of claim 1, where the buffer circuitry is configured to store the target reference picture among a set of candidate reference pictures.

3. The device of claim 1, where the subgroup vector selection circuitry is configured to select the spatiotemporal neighbor pixel group from among a set of candidate spatiotemporal neighbor pixel groups within the current picture and a temporal neighbor picture stored within the buffer circuitry.

4. The device of claim 3, where the subgroup vector selection circuitry is configured to select the spatiotemporal neighbor pixel group from among the set of candidate spatiotemporal neighbor pixel groups responsive to the reference vector comprising a first available motion vector found within the set of candidate spatiotemporal neighbor pixel groups.

5. The device of claim 1, where:
the target reference picture comprises a single candidate reference picture available for the current picture; and
the subgroup vector selection circuitry is configured to initiate scaling of the reference vector without first receiving an indication that the target reference picture was selected by the candidate selection circuitry.

6. The device of claim 1, the co-located pixel group comprises a first pixel that occupies the spatial position within the target reference picture that is occupied by the pre-determined pixel of the current pixel group in the current picture.

7. The device of claim 1, where the subgroup vector selection circuitry is configured to process the predictor motion vector to generate the subgroup motion vector by scaling the predictor motion vector in accord with another ratio of the first duration to a third duration between the target reference picture for the pixel subgroup and a predictor picture defined by the predictor motion vector.

8. A method comprising:
accessing a target reference picture available for a current pixel group in a current picture;
determining that a co-located pixel group of the target reference picture has an assigned candidate motion vector, the co-located pixel group occupying a space in the target reference picture occupied at least in part by the current pixel group in the current picture;
determining that a neighbor pixel group has an assigned reference vector that indicates a predictive relationship that points to a reference vector picture;

scaling the predictive relationship according to a relative temporal position of the target reference picture, the reference vector picture, and the current picture to determine an offset vector;

forgoing application of the offset vector for selection of a default motion vector for the current pixel group;

applying the offset vector by shifting the current pixel group in accord with the offset vector, and then determining whether a pre-determined pixel of a pixel subgroup of the current pixel group occupies a spatial position that is occupied by a predictor pixel group of the target reference picture that is assigned a predictor motion vector;

when the pre-determined pixel of the pixel subgroup occupies the spatial position that is occupied by the predictor pixel group of the target reference picture that is assigned the predictor motion vector, processing the predictor motion vector to generate a subgroup motion vector for the pixel subgroup; and when the pre-determined pixel of the pixel subgroup does not occupy the spatial position that is occupied by the predictor pixel group of the target reference picture that is assigned the predictor motion vector, using the default motion vector as the subgroup motion vector irrespective of whether other predictor pixel groups are assigned prediction motion vectors.

9. The method of claim 8, further comprising selecting the target reference picture from among a set of candidate reference pictures responsive to determining that the co-located pixel group has the assigned candidate motion vector.

10. The method of claim 8, further comprising selecting the neighbor pixel group from among a set of candidate neighbor pixel groups within the current picture responsive to determining that the neighbor pixel group has the assigned reference vector.

11. The method of claim 10, where selecting the neighbor pixel group from among the set of candidate neighbor pixel groups within the current picture comprises selecting the neighbor pixel group responsive to the assigned reference vector comprising a first available motion vector found within the set of candidate neighbor pixel groups.

12. The method of claim 8, where:
the target reference picture comprises a single reference picture available for the current picture; and
scaling the predictive relationship comprises scaling the predictive relationship in a parallel operation with determining that the co-located pixel group has the candidate motion vector, without first receiving an indication that the target reference picture has been selected.

13. The method of claim 8, further comprising performing selection of the default motion vector by:
determining that the co-located pixel group comprises a first pixel that occupies the spatial position within the target reference picture that is occupied by the pre-determined pixel of the current pixel group in the current picture; and
processing a co-located motion vector assigned to the co-located pixel group to generate the default motion vector.

14. The method of claim 8, where the co-located pixel group comprises a first pixel that occupies the spatial position within the target reference picture that is occupied by the pre-determined pixel of the current pixel group in the current picture.

15. A product comprising:
a machine readable medium other than a transitory signal; and
instructions stored on the machine readable medium, the instructions, when executed, configured to cause motion vector prediction circuitry to:
identify a candidate motion vector assigned to a co-located pixel group in a target reference picture for a current pixel group in a current picture, the co-located pixel group comprising a pixel position in the target reference picture included in the current pixel group in the current picture;
in response to identifying the candidate motion vector, select the target reference picture;
without first shifting the current pixel group in accord with a offset vector, initiate processing of the candidate motion vector to generate a default motion vector; and
determine subgroup motion vectors for multiple pixel subgroups of the current pixel group by:
identifying a reference vector assigned to a neighbor pixel group, the reference vector configured to signal a predictive relationship that points to a reference vector picture;
determining a scaling factor using a ratio of a first duration between the target reference picture and the current picture to a second duration between the target reference picture and the reference vector picture;
applying the scaling factor to the reference vector to determine the offset vector;
shifting the current pixel group in accord with the offset vector, and then determine whether a pre-determined pixel of the pixel subgroup occupies a spatial position that is occupied by a predictor pixel group that is assigned a predictor motion vector;
when the pre-determined pixel of the pixel subgroup occupies the spatial position that is occupied by the predictor pixel group that is assigned the predictor motion vector, processing the predictor motion vector to generate a subgroup motion vector for the pixel subgroup; and
when the pre-determined pixel of the pixel subgroup does not occupy the spatial position that is occupied by the predictor pixel group that is assigned the predictor motion vector, assigning the default motion vector to the pixel subgroup without searching other predictor pixel groups for a predictor motion vector for the pixel subgroup.

16. The product of claim 15, where the instructions are further configured to cause the motion vector prediction circuitry to select the target reference picture from among a set of candidate reference pictures responsive to identification of the candidate motion vector.

17. The product of claim 15, where the instructions are further configured to cause the motion vector prediction circuitry to select the neighbor pixel group from among a set of candidate neighbor pixel groups within the current picture and a temporal neighbor picture.

18. The product of claim 17, where the instructions are further configured to cause the motion vector prediction circuitry to select the neighbor pixel group from among the set of candidate neighbor pixel groups by selecting the neighbor pixel group responsive to the reference vector comprising a first available motion vector found within the set of candidate neighbor pixel groups.

19. The product of claim 15, where:
the target reference picture comprises a single candidate reference picture available for the current picture; and
scaling of the reference vector is initiated without first receiving an indication that the target reference picture was selected.

20. The product of claim 15, where the co-located pixel group comprises a first pixel that occupies the spatial position within the target reference picture that is occupied by the pre-determined pixel of the current pixel group in the current picture.

* * * * *